United States Patent Office 3,484,271
Patented Dec. 16, 1969

3,484,271
TWO STEP IN SITU REACTION FOR PRODUCING COATED PAPER WEBS
Adam F. Kaliski, Trenton, and Robert M. Husband, Milford, N.J., assignors to Riegel Paper Corporation, New York, N.Y., a corporation of Delaware
No Drawing. Filed June 25, 1965, Ser. No. 467,084
Int. Cl. D21h 1/10, 1/30; C08h 19/00
U.S. Cl. 117—62.1
16 Claims

ABSTRACT OF THE DISCLOSURE

A two step in situ ionic metathesis reaction for producing an insoluble complex salt coating on paper and paper-like substrates is disclosed. The disclosed coatings have predetermined functional properties such as release characteristics depending on the reactants chosen. The two step reaction involves an ionic interchange between the salt of a fatty organic acid preferably having a polyfunctional anionic component and an organometallic salt preferably including a polyfunctional cationic component.

---

This invention relates to novel methods of forming surface coatings of tailored predetermined characteristics and to articles produced thereby and, more particularly, to a novel two-step method of producing release coatings of greatly improved properties over those produced by prior art techniques, with a particular application of this unique method being to the paper industry.

Techniques are know today to provide various substrates such as paper webs with coatings imparting release and other like properties to such substrates. For example, Du Pont supplies a product called "Quilon" which is usable in creating surfaces which release from some variety of plastic masses cast upon them and which, at the same time, are both hydrophobic and oleophobic. "Quilon" is a liquid containing about 29–30% of a chrome complex, about 65–70% of isopropanol and less than about 5% of water. The chrome complex is considered to be represented by the following formula:

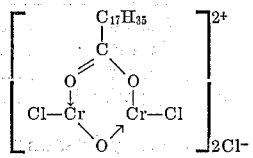

Upon dilution, raising the pH or by mild heating, partial hydrolysis takes place with the formation of a basic complex suggested to be as follows:

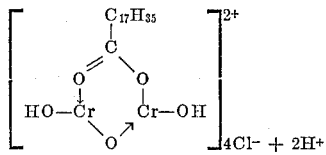

In the usual method of using "Quilon" for applying release surfaces to a given substrate, a solution of "Quilon" is heated to approximately 200° F. either before or after application to the substrate in order to form a poly-condensate of "Quilon" through a series of —Cr—O—Cr— linkages believed to be as follows:

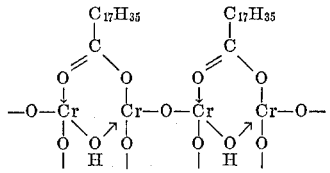

A permanent coating results, believed to be held to the surface of the substrate by covalent chemical bonds with that surface.

Since hydrochloric acid is a by-product of the reaction involved, a neutralizer usually must be added to counteract this hydrochloric acid formation, particularly when substrates are used (such as paper) which are likely to be damaged by this by-product. This neutralizer may be added directly to the "Quilon" solution before application to the substrate.

In accordance with the present invention, an improved method has now been discovered to impart release and other properties to a great variety of substrates which is extremely economical and which provides products of highly superior characteristics and versatility in use. This novel process is a two-step method which involves the carrying out of ionic reaction of metathesis on the substrate being treated.

It is accordingly a primary object of the present invention to provide novel methods for forming release coatings and the like, as well as articles produced thereby.

It is another important object of the present invention to provide a novel method for forming surfaces which are oleophobic and/or hydrophobic and which release easily and completely from a variety of plastic and other masses cast upon them.

It is still another important object of the present invention to provide a novel method for forming release coatings involving a two-step process in the course of which a release coating is formed on a given substrate by means of an ionic reaction of metathesis.

It is a further important object to provide a novel method for forming a release coating on a variety of substrates which can make unnecessary the usual requirement for neutralization of acid by-products formed during the course of the formation of the release coating, making the novel method particularly useful for treating paper and the like.

These and further additional objects and advantages of the present invention will become more apparent upon reference to the ensuing description and appended claims.

The novel process of the present invention involves a two-step process which may best be illustrated in connection with the formation of a release coating on a travelling web of paper. In a first step of the process, the paper web is coated with a first liquid material in the course of its travel. After the free film of the first coating has disappeared from the surface of the paper web, a second coating of a second liquid material is coated upon the first coating and, subsequently, the paper web is dried in a conventional manner. In a typical practical application of the invention, for on-machine coating of a paper web, the first and second coatings may be applied at coating presses interposed in the dryer section of the paper machine. In such a case, there typically would be at least some drying of the web between application of the first and second coatings.

The significant advantages of the present invention are obtained by so selecting the components of the first and second liquid materials that the dominant reaction which takes place between such components upon the application of such materials to the paper web is an ionic reaction of metathesis (in contradistinction to the poly-condensation process involved in the conventional application of "Quilon" and the like to paper webs and other substrates). In order to effect this ionic reaction of metathesis, one of said liquid materials must contain a compound having an active anionic component which contains at least one (and advantageously more) functional group which can be substituted by the active cationic component of a compound contained by the other of said liquid materials in said ionic reaction of metathesis. The compound in the other of said liquid materials must have an active cationic component which contains at least one (and advantageously more) functional group which can be substituted onto the active anionic component of the compound in the first liquid material in said ionic reaction of metathesis. In addition, the first and second liquid materials must be so selected and used in quantities such that the dominant reaction between them will be said ionic reaction of metathesis rather than a competing reaction such as poly-condensation. The reaction materials advantageously are highly surface active and are sufficiently affinitive with one another to permit their respective active anionic and cationic components to react in said ionic reaction of metathesis.

In order to achieve coatings having superior release characteristics, it appears to be necessary in most cases that the principal reaction materials be polyfunctional; that is, each should have two or advantageously more functional groups which can be substituted by the anionic or cationic (as the case may be) components of the other reaction material. Optimum release properties are achieved when one polyfunctional material is reacted with another, in the manner of the invention. Other advantageous surface characteristics may be realized through the reaction of two monofunctional materials, as well as through the reaction of a monofunctional material with a polyfunctional material.

As will be apparent to those skilled in the art, a great number of different materials may be utilized to obtain the outstanding results of the present invention within the forgoing set of guides and limitations. Particularly outstanding release characteristics are obtained using as the source of the active anionic component a water-soluble salt of a large alkyl or alkyl aryl organic acid, an aqueous solution being the most desirable vehicle for such liquid material. Best results are obtained through the use of salts of di- or poly-basic acids (though monobasic acid salts of large aliphatic molecules may also be employed in appropriate cases). Results satisfactory to some uses have been obtained using a water-soluble salt of a dialkyl carboxylic ester of sulphosuccinic acid sold under the trade-name of "Aerosol OT." (This particular material is the dioctyl ester of the named acid.) Excellent results for demanding release applications have also been obtained utilizing a water-soluble salt of an N-(1,2-dicarboxyethyl)-N-alkyl sulphosuccinamate, one such material being sold under the trade name "Aerosol 22" (this particular material being the tetrasodium salt, with the alkyl constituent being octadecyl). Particularly advantageous results are realized when the reaction materials are highly surface active.

Salts of the organic acids are highly preferred in the practice of the present invention since the actions of the reacting acid functions will combine with the anions of the active cationic component in the second liquid material, thereby obviating the need for any neutralizer to be added, at least when the respective materials utilized in the first and second liquid coating materials are used in the proper stoichiometric quantities. If neutralization is not a problem, however, the free acids may sometimes be used. But regardless of which type of material is used, acid or salt, the material should be soluble in the vehicle (e.g., water) which carries it.

Particularly excellent results have been obtained utilizing a first liquid coating material whose active compound has a molecular weight of at least about 130 and which is monomeric.

Excellent results have been obtained using as a source of the active cationic component a salt of an organic acid, although cationic organic bases are also useful. In a particularly desirable embodiment, an organometallic salt is utilized. Since, as previously stated, the first and second liquid materials must be sufficiently affinitive (i.e., compatible for the purpose intended) with one another to permit their respective active anionic and cationic components to react in said ionic reaction of metathesis, the vehicle for the compound containing the active cationic component must possess this necessary characteristic. In those cases where the liquid material containing the active anionic component is aqueous, the vehicle for the other of the liquid materials (that containing the active cationic component) must at the very least be miscible with said aqueous solution.

Highly advantageous results have been obtained using as the second liquid material the material previously referred to as "Quilon," which is a chrome complex in an alcohol-water vehicle. Still other organic salts will suggest themselves to those skilled in the art for the liquid material containing the active cationic component such, for example, as a material sold by the Minnesota Mining & Manufacturing Company under the trademark "FC-805," which is a chromium complex of a short chain hydrocarbon acid which has been highly fluorinated. Another material for this purpose is one sold by the Sun Chemical Company under the trademark "Impregnol FH," which is a zirconium stearate-acetate. This material is sold as an aqueous emulsion which is stated to be and behaves as a dispersion of cationic material. Other materials utilized as the second liquid material include a variety of quaternary ammonium halides. Illustrative of these materials are the following compositions: "Hyamine 1622," a diisobutylphenoxyethoxy-ethyldimethylbenzyl ammonium chloride, manufactured by Rohm and Haas; "Ammonyx 2194," a ditallowdimethyl ammonium methyl sulphate, manufactured by Onyx Chemical: "Arquad 18-50," "Arquad L-11," and "Arquad L-15," n-alkyltrimethyl ammonium chlorides, manufactured by Armour Industrial Chemical Co.; "Ethoquad C/12," a polyethoxylated quaternary ammonium salt, manufactured by Armour Industrial Chemical Co.; "Dow QX 2611.7," a vinylbenzyl quaternary ammonium compound, manufactured by Dow Chemical Company and indicated to be the subject matter of U.S. Patent No. 3,011,918; "Hyamine 10-X," a diisobutylcresoxy-ethoxyethyldimethylbenzyl ammonium chloride, manufactured by Rohm and Haas; "Hyamine 2389," a methyldodecylbenzyl-trimethyl ammonium chloride-methyldodecylxylene bis[trimethyl ammonium chloride] compound manufactured by Rohm and Haas; and "Hyamine 3500," an n-alkyl [C-12, C-14, C-16], n-alkyl dimethyl benzyl ammonium chloride, manufactured by Rohm and Haas.

Particularly excellent release coatings have been obtained utilizing a liquid coating material containing the active cationic component whose active compound has a molecular weight of at least about 400 and which is monomeric. For other tailored functional surface coatings, lower molecular weights, down to about 250, may be suitable. In other words, when reacting polyfunctional materials to achieve superior release properties, the molecular weights of the polyfunctional materials should be around 400 or greater. Monofunctional reacting materials, for achieving other surface properties, may have lower weights, but not significantly less than 250.

A particularly simple and straightforward test which may be employed by those skilled in the art to determine compounds which will be effective in the practice of the present invention as the active components of the first and second liquid materials involves the mixture of a proposed material containing an active cationic component with one having an active anionic component. Unless an instant clouding or flocculation of reaction product occurs on blending solutions of these materials even at concentrations of the active materials not exceeding 0.5% by weight of the total solution, the materials probably are not usable in the process of the present invention.

The high reaction speed demonstrated by materials satisfying the foregoing test is believed to be extremely significant insofar as the practice of the present invention is concerned, since it makes possible the production of uniform surface coatings on extremely fast-moving substrata. At the same time, it avoids an excessive desorption or leaching out of a previously deposited and adsorbed first reactive compound by the solution of the second liquid material during overcoating. Such leaching could give rise to a less favorable arrangement of the molecules in a surface layer or even reduce the adhesion between the resultant coating and the substrata. In a drastic case, an undesirable, granular precipitation of the reaction products on the top of the coated surface may even occur. Thus, the reaction materials and conditions should be so chosen as to favor the rate of ionic reaction over the rate of desorption.

In the practice of the process of the present invention, the liquid coating material containing the anionic component may be applied first, followed by treatment with the liquid coating material containing the active cationic component. In some cases this procedure may be reversed, if desired. It should be noted, however, that most desirable results are obtained when the liquid coating material containing the active anionic component is applied first. For example, in the situation where an abhesive material such as "Quilon" is used as the active cationic component-containing material, the abhesive solution should be applied as the second coat. Application of "Quilon," for example, in the first stage may reduce the efficiency of the reaction, because the abhesive character of the "Quilon" would make it difficult to apply or spread the second material uniformly to the web surface, so that the reaction materials could not uniformly be brought into reacting association.

The active components of the two treating materials react instantaneously in an ionic reaction of metathesis in accordance with the process of the present invention to form an insoluble precipitate in the form of a large molecule complex salt in the form of a monomeric organic salt or a polymer organic salt, said large molecule complex salt having a molecular weight of at least about 500. Furthermore, as has previously been stated, where organic salts are employed in the process, the cations of the reacting acid functions will combine with the anions associated with the active cationic component, thereby obviating the need for adding a neutralizer when the respective active materials are proportioned according to the proper stoichiometry. This reaction may be readily illustrated by considering the treatment of a moving paper web having the application of a first coating containing a water-soluble salt of an organic acid and a second coating containing "Quilon." The reaction which takes place between the active components is thought likely to be as follows:

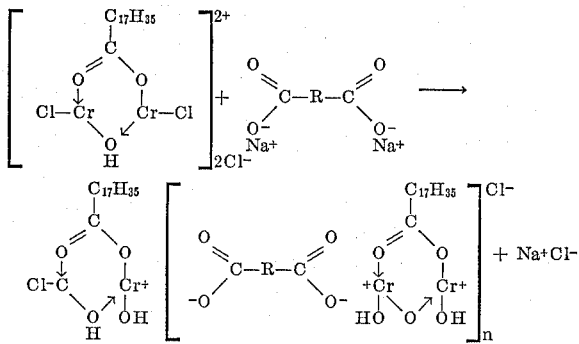

As will be noted, in addition to the reaction between the active cationic component of the "Quilon" and the active anionic component of the salt in the other liquid material, the sodium cations of the reacting acid functions have combined with the chloride gegenions of the "Quilon," thus obviating the need for a neutralizer.

The quantities of each of the active components necessary to obtain the desired results will necessarily vary, depending upon the particular materials employed. For example, the divalent "Quilon" cation can react with one or two molecules of the salt of a dialkyl ester of sulphosuccinic acid and will react with two extensively only if the product of the reaction with one molecule is sufficiently soluble in the environmental fluid during the very brief interval when there is a fluid medium on the surface of the substrate after the "Quilon" solution has been applied and before the water and alcohol of the "Quilon" migrate into the paper sheet. In all other cases there is a possibility of repeated reaction between the active components until an insoluble salt precipitates from solution or is left deposited on the surface. The value of "$n$" in the foregoing equation will necessarily vary, therefore, depending on the reactants employed and various other reaction variables. Of course, if the generalized organic entity "R" should be a large hydrocarbon or the like entity, "$n$" might be limited to 1 or the reaction might be further limited to one or two molecules of "Quilon" with one molecule of acid.

If the anionic component is chosen to be a material such as ethylenediaminetetra- or pentaaccetate or other tetra-basic or poly-basic acid or acid salt of appropriate structure, it is also possible that the precipitate, using the appropriate multivalent metallo-organic cationic components, could be a more complex chelate salt rather than a simple oligo or polymer salt.

Another type of polymer salt may be formed if the salt of an appropriate polymer acid is included in the first treatment with the active anionic component-containing material. For example, the use of such material in combination with "Quilon" used as the second treating solution would create salt appendages or cross-linked salt structure between chains at many of the anionic sites, as follows:

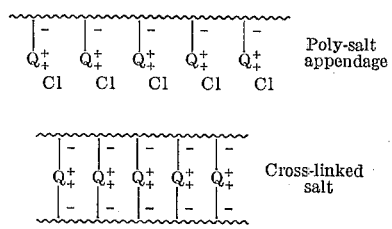

Since such a structure may be desired, it is within the contemplation of the present invention to include a polymer acid or salt of such polymer acid alone or in admixture with the active anionic component-containing coating material in the first coating step. For example, the first coating material can advantageously contain approximately 1–1½% by weight of the material previously identified as "Aerosol 22" and approximately 2–5% of the sodium salt of carboxymethyl cellulose, the latter being a salt of a type of polymer acid. The salt of carboxymethyl cellulose helps to "hold-out" the more expensive "Aerosol 22" so that solutions of approximately 1% strength (rather than 3% strength without such hold-out properties) may be used.

In a typical example in accordance with the present invention, a relatively coarse and uncalendered moving paper web is coated in a first treatment with a mixture of "Aerosol 22" and the sodium salt of carboxymethyl cellulose in the proportions above indicated, these materials being in a water solution. As the paper web moves along and after any free film which may have been formed on its surface has disappeared, a water solution containing about 7% by weight of "Quilon" is applied over the first coating. An ionic reaction of metathesis immediately takes place, without the necessity for any heating, to form a high release coating on the paper web which is distinctly superior to those obtained by conventional procedures. The thus treated paper web is then dried in a conventional manner.

As previously stated, the manufacturer's instructions for using "Quilon" for imparting release characteristics to a given substrate require that the "Quilon" solution be heated so as to form a poly-condensed product. In accordance with the practice of the present invention, there is no need to heat the "Quilon" solution before use and, on the contrary, it would be generally undesirable and uneconomical to do so, although not necessarily harmful. Furthermore, there is no need to heat the treated surface after the application of the "Quilon" for purposes of causing the desired reaction, though it is ordinarily desirable to dry the treated paper web in a conventional manner. Consequently, the temperature-time relationship of drying is fully independent of any chemical reaction and its associated conditions.

As a result of the present invention, surfaces can be applied to paper and other substrata to make them (1) highly resistant to the movement or crawling of greases and oils, (2) water-repellant though permeable to air and other gases, and (3) oil-repellant and abhesive to a variety of plastic masses. For example, such surfaces will release phenol-aldehyde resins pressed and set upon them at 300° F. and 1000 psi. They will also release from vinyl resins cast upon them as liquids and cured rapidly to 400° F. Still further, these surfaces are abhesive to many resins cast and heated to foam upon them. Indeed, the process of the present invention makes possible the tailoring of coatings for specific purposes in innumerable areas, e.g., in the production of:

(a) abhesive paper coatings for backup layers or casting of plastic products;
(b) adhesion primers;
(c) solvent "hold-out" coatings;
(d) anti-crawl papers;
(e) water-repelling coatings;
(f) container-lining papers for oils and chemicals;
(g) low-background papers for electrostatic printing;
(h) thermally resistant paper coatings;
(i) leather finishes;
(j) chemically resistant plywood;
(k) breathing encapsulation of powders or pellets; and the like.

In tailoring such coatings for specific purposes, one can produce coatings which are primarily of a "breathing" type; i.e., they are permeable to gases and vapors to a degree which should not differ substantially from that characteristic for corresponding uncoated surfaces. Alternatively, if functional coatings with barrier properties are desired, nonionic or compatible ionic polymers can be used in the first coating or any of the subsequent ones (such polymer should, of course, be soluble in the vehicle carrying it).

In the process of the invention the principal reactants, which are incompatible for the purposes intended when present simultaneously in the same aqueous solution, are deposited separately on a selected surface under conditions which enable the reactants to combine in an ionic reaction of metathesis. This leads to the formation of a surface coating having predetermined characteristics due to the formation of large organic salts (sometimes poly salts) of substantial molecular weight, which are hydrophobic and often also oleophobic. One of the more significant of these obtainable characteristics is a superior release property, obtainable by reacting polyfunctional materials, such as "Aerosol 22" and "Quilon."

The invention may be embodied in other specific forms without departing from the spirit or essential characteristics thereof. The present embodiments are, therefore, to be considered in all respects as illustrative and not restrictive.

We claim:
1. A coated substrate comprising
 (a) a paper-like base web, and
 (b) a water insoluble complex salt coating on a surface of said base web,
 (c) said coating being the reaction product of a predominantly ionic reaction of metathesis beween a first reactant having an anionic component and a second reactant having a cationic component,
 (d) said first reactant being chosen from the group consisting of the dialkyl carboxylic esters of sulphosuccinic acid and the salts of N-(1,2-dicarboxyethyl)-N-alkyl sulphosuccinamate,
 (e) said second reactant being chosen from the group consisting of long chain alkyl chromic chloride complexes, short chain highly fluorinated hydrocarbon acid chromium complexes zirconium stearate-acetates and quaternary ammonium halides.

2. The coated substrate of claim 1, wherein
said second reactant is a quaternary ammonium halide chosen from the group consisting of diisobutyl-phenoxy-ethyoxy-ethyldimethyl-benzyl ammonium chloride, ditallowdimethyl ammonium methyl sulphate, n-alkyltrimethyl ammonium chlorides, polyethyoxylated quaternary ammonium salt, vinylbenzyl quaternary ammonium compounds, diisobutylcresoxyethyoxethyl-dimethylbenzyl ammonium chloride, methyldodecylbenzyl- trimethyl ammonium chloride methyldodecylxylene bis [trimethyl ammonium chloride] compounds, n-alkyl [C–12, C–14, C–16], n-alkyl dimethyl benzyl ammonium chloride.

3. The coated substrate of claim 1, wherein
said second reactant is sterato chromic chloride.

4. The coated substrate of claim 1, wherein
said first reactant is the dioctyl carboxylic ester of sulphosuccinic acid.

5. The coated substrate of claim 1, wherein
said second reactant is zirconium stearate-acetate.

6. The coated substrate of claim 3, wherein
said first reactant is the tetrasodium salt of N-(1,2-dicarboxyethyl)-N-octadecyl sulphosuccinamate.

7. A coated substrate comprising
 (a) a paper-like based web, and
 (b) a water insoluble complex salt coating on a surface of said base web,
 (c) said coating being the reaction product of a predominantly ionic reaction of metathesis between a salt of a large alkyl or alkyl aryl organic acid having a polyfunctional anionic component and an organometallic salt including a polyfunctional cationic component,
 (d) said organometallic salt being chosen from the group consisting of alkyl chromic halide complexes.

8. The coated substrate of claim 7 wherein
said organometallic salt is a long chain alkyl chromic chloride complex.

9. A coated substrate comprising
 (a) a paper-like base web,
 (b) a water insoluble complex salt coating on a surface of said base web,
 (c) said coating being the reaction product of a predominantly ionic reaction of metathesis between a first reactant having an anionic component and a second reactant having a cationic component,
 (d) said first reactant being chosen from the group consisting of the salts of large alkyl or alkyl aryl organic acids having a polyfunctional anionic component,
 (e) said second reactant being chosen from the group consisting of long chain alkyl chromic chloride complexes, short chain highly fluorinated hydrocarbon acid chromium complexes and zirconium stearate-acetate.

10. The coated substrate of claim 9, wherein
said first reactant is chosen from the group consisting of salts of N-(1,2-dicarboxyethyl)-N-alkyl sulphosuccinamate.

11. The coated substrate of claim 9, wherein
said second reactant is sterato chromic chloride.

12. The coated substrate of claim 10 wherein
 (a) said first reactant being the tetrasodium salt, with the alkyl contituent being octadecyl, and (b) said second reactant being sterator chromic chloride.

13. A method for coating paper and paper-like substrates to improve their release characteristics, comprising
(a) applying an aqueous solution including a polyfunctional cationic reactant chosen from the group consisting of long chain alkyl chromic chloride complexes, short chain highly fluorinated hydrocarbon acid chromium complexes, zirconium stearate-acetate and quaternary ammonium halides, to a surface of said substrate,
(b) applying an aqueous solution including a polyfunctional anionic reactant to said surface of the substrate,
(c) said cationic and anionic reactants reacting on said surface in an ionic reaction of metathesis to form a water insoluble complex salt coating, having a molecular weight greater than 250, and
(d) drying the coated substrate subsequent to said ionic reaction of metathesis.

14. The method of claim 13 wherein
(a) the aqueous solution of said polyfunctional anionic reactant is first applied to said substrate, and
(b) the aqueous solution of said polyfunctional cationic reactant is applied to said substrate after any substantial free film of the first aqueous solution has disappeared.

15. The method of claim 13, wherein said anionic reactant is chosen from the group consisting of the dialkyl carboxylic esters of sulphosuccinic acid and the salts of an N-(1,2-dicarboxyethyl)-N-alkyl sulphosuccinamate.

16. The method of claim 13, wherein said cationic reactant is sterato chromic chloride.

References Cited

UNITED STATES PATENTS

| | | | |
|---|---|---|---|
| 1,536,254 | 5/1925 | White | 117—62 |
| 1,717,483 | 6/1929 | White | 8—116 |
| 1,990,292 | 2/1935 | Leatherman | 91—68 |
| 2,273,040 | 2/1942 | Iler | 117—100 |
| 2,356,161 | 8/1944 | Iler | 117—121 |
| 2,726,164 | 12/1955 | Eichmeier | 117—154 X |
| 2,864,723 | 12/1958 | Fluck et al. | 117—76 |
| 2,934,450 | 4/1960 | Brown | 117—154 X |
| 3,083,118 | 3/1963 | Bridgeford | 117—62.2 X |
| 3,138,477 | 6/1964 | Torstenson | 117—154 X |
| 3,220,849 | 11/1965 | Baden et al. | 117—62.2 X |
| 3,224,898 | 12/1965 | Spencer | 117—155 X |
| 3,335,017 | 8/1967 | Spencer | 117—5.1 X |
| 3,027,270 | 3/1962 | Cotton et al. | 117—62.1 |
| 3,136,663 | 6/1964 | McDonald | 117—62.1 X |
| 2,999,768 | 9/1961 | Boresch | 117—152 X |

OTHER REFERENCES

Iler, R. K., Sterato Chromic Chloride, Industrial and Engineering Chemistry, vol. 46, No. 4, pp 766–769.

WILLIAM D. MARTIN, Primary Examiner

M. R. LUSIGNAN, Assistant Examiner

U.S. Cl. X.R.
117—5.1, 154, 157

UNITED STATES PATENT OFFICE
CERTIFICATE OF CORRECTION

Patent No. 3,484,271　　　　　Dated December 16, 1969

Inventor(s) Adam F. Kaliski and Robert M. Husband

It is certified that error appears in the above-identified patent and that said Letters Patent are hereby corrected as shown below:

Column 1, line 31, "know" should read --known--. Column 4, line 29, "Chemical:" should read --Chemical;--
Column 5, lines 61, 62, that portion of the formula reading $$Cl^- \overset{O}{\underset{\downarrow}{C}}$$

should read $$Cl^- \overset{O}{\underset{\downarrow}{Cr}}$$

Column 5, lines 58-64, that portion of the formula reading $$\left. \phantom{x} \right]_n Cl^-$$

should read $$\left. \phantom{x} \right]_n Cl^-$$

Column 6, line 20, "pentaaccetate" should read --pentaacetate--.
Column 8, line 10, after "complexes" insert a comma. Column 8, line 20, "ethyoxethyl" should read --ethyoxyethyl--. Column 8, line 75, "contituent" should read --constituent--. Column 9, line 1, "sterator" should read --sterato--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents